United States Patent
Brotherson et al.

(10) Patent No.: US 11,539,583 B2
(45) Date of Patent: *Dec. 27, 2022

(54) DYNAMIC NETWORK DISCOVERY SERVICE FOR SYSTEM DEPLOYMENT AND VALIDATION

(71) Applicant: NetApp, Inc., Sunnyvale, CA (US)

(72) Inventors: Marc Wayne Brotherson, Boulder, CO (US); Derek John Leslie, Erie, CO (US)

(73) Assignee: NetApp, Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/090,107

(22) Filed: Nov. 5, 2020

(65) Prior Publication Data

US 2021/0058294 A1 Feb. 25, 2021

Related U.S. Application Data

(63) Continuation of application No. 15/934,935, filed on Mar. 23, 2018, now Pat. No. 10,841,157.

(51) Int. Cl.
| | |
|---|---|
| *H04L 41/0816* | (2022.01) |
| *H04L 47/36* | (2022.01) |
| *H04L 41/12* | (2022.01) |
| *H04L 12/66* | (2006.01) |
| *H04L 41/0806* | (2022.01) |
| *H04L 12/46* | (2006.01) |
| *H04L 41/0823* | (2022.01) |

(52) U.S. Cl.
CPC ...... *H04L 41/0816* (2013.01); *H04L 12/4641* (2013.01); *H04L 12/66* (2013.01); *H04L 41/0806* (2013.01); *H04L 41/0823* (2013.01); *H04L 41/12* (2013.01); *H04L 47/36* (2013.01)

(58) Field of Classification Search
CPC ............ H04L 41/0816; H04L 41/0806; H04L 41/0823; H04L 41/12; H04L 12/4641; H04L 12/66; H04L 47/36

See application file for complete search history.

(56) References Cited

U.S. PATENT DOCUMENTS

| | | | |
|---|---|---|---|
| 6,336,138 B1 * | 1/2002 | Caswell | H04L 41/12 709/224 |
| 7,293,080 B1 | 11/2007 | Clemm et al. | |
| 7,317,693 B1 * | 1/2008 | Roesch | H04L 43/18 370/254 |
| 7,349,961 B2 | 3/2008 | Yamamoto | |
| 9,600,386 B1 | 3/2017 | Thai et al. | |
| 10,389,589 B2 * | 8/2019 | Grisco | H04L 41/0853 |
| 2004/0199756 A1 | 10/2004 | Graves et al. | |
| 2007/0244999 A1 | 10/2007 | Hamanaka et al. | |

(Continued)

*Primary Examiner* — Azizul Choudhury
(74) *Attorney, Agent, or Firm* — Jaffery Watson Mendonsa & Hamilton LLP

(57) ABSTRACT

One or more nodes on a network can run a network discovery service to obtain information regarding network configuration parameters for the nodes on the network by passively listening for packets received on one or more ports. The discovered network configuration data can be used to identify a configuration for various types of nodes. The configuration can then be used to facilitate checking, testing, or self-configuration of a network configuration of one of the nodes (e.g., a lead node or a new node).

19 Claims, 5 Drawing Sheets

(56) References Cited

U.S. PATENT DOCUMENTS

2009/0304381 A1 12/2009 Muppidi et al.
2010/0121946 A1 5/2010 Claes et al.
2014/0304352 A1 10/2014 Chaudhary et al.

* cited by examiner

DYNAMIC NETWORK DISCOVERY SERVICE FOR SYSTEM DEPLOYMENT AND VALIDATION

CROSS-REFERENCE TO RELATED PATENTS

This application is a continuation of U.S. patent application Ser. No. 15/934,935, filed on Mar. 23, 2018, which is hereby incorporated by reference in its entirety for all purposes.

BACKGROUND

The disclosure generally relates to the field of data processing, and more particularly to multicomputer data transferring.

Configuring nodes in a computer network can be a complicated problem. A typical network can have many nodes, any one of which can cause problems on the network if not configured properly. Often, networks are configured manually, for example, by entering commands at a console in a data center. Such a process can be cumbersome and error-prone. A misconfigured node can cause serious performance degradation for the node, and for the networked system as a whole. Additionally, it can be difficult to pinpoint the cause of the problem in a network having many nodes.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a network discovery service in illustrative examples. Aspects of this disclosure can be also applied to applications, plug-ins, browser extensions etc. In other instances, well-known instruction instances, protocols, structures and techniques have not been shown in detail in order not to obfuscate the description.

Overview

Various aspects of the disclosure include systems and methods for performing network discovery by one or more nodes on a network to obtain information regarding network configuration parameters for the nodes on the network. In some aspects, the network configuration data can be compared and used to determine if there are mismatches between the configurations of the various nodes. A mismatch can indicate that a node is misconfigured, which can result in significant degradation in performance of the node or of the network system as a whole. Additionally, the network configuration data that is discovered by a node can be used to establish an initial configuration for the node.

Example Illustrations

Figure 1:
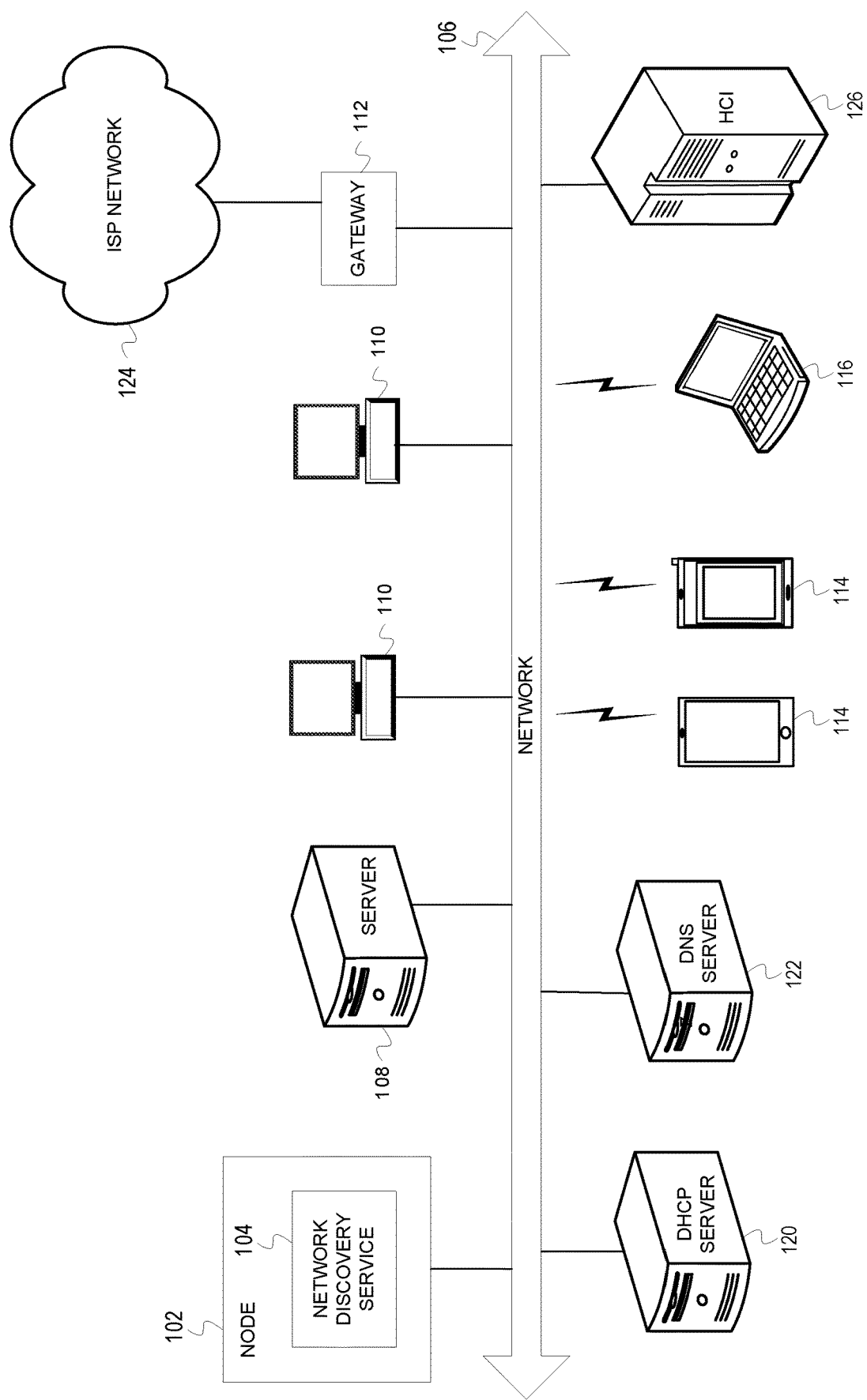
FIG. 1 depicts an example networked system including a node having a network discovery service.

FIG. 1 depicts an example networked system 100 including a node having a network discovery service. Various types of nodes can be connected to a network 106. A node can be any type of computing device having at least one processor or other logic, a memory, and a network interface. For example, nodes on a network 106 can include server computers 108, desktop computers 110, smart phones 114, and laptop computers 116. Additionally, nodes on network 106 can include nodes within a Hyper Converged Infrastructure (HCI) system 126. In an HCI system, computing, networking, storage area network, and data storage components can be grouped together as a single unit. The HCI system 126 can provide virtualized versions of the various hardware components. Further, HCI system 126 can also provide management infrastructure to manage the components of the HCI system. Various other types of computing devices may be included as nodes on a network 106. As additional examples, a network 106 can include Internet of Things (IoT) devices, set top boxes, smart televisions, video game consoles and other such devices.

Network 106 can include a gateway 112. Gateway 112 can couple network 106 to a different network that may be using a different physical layer or link layer protocol. For example, gateway 112 may couple network 106 to an Internet Service Provider (ISP) network 124. The nodes on network 106 side of gateway 112 can form a broadcast domain. For example, a broadcast packet transmitted by a node on network 106 can be received by any or all of the nodes on network 106, but will not be seen by nodes on networks accessed via ISP network 124.

Network 106 can include a Dynamic Host Configuration Protocol (DHCP) server 120. A DHCP server 120 can assign Internet Protocol (IP) addresses to nodes on network 106. For example, a node can issue a request to DHCP server 120 to obtain an Internet Protocol (IP) address.

Network 106 can also include a Domain Name System (DNS) server 122. DNS server 122 can store data that maps domain names to IP addresses. For example, a client node can issue a query to DNS server 122 to obtain the IP address associated with a particular domain name.

Network 106 can be comprised of one or more wired networks, one or more wireless networks, or a combination of wired and wireless networks. Further, network 106 can be segregated into multiple networks using Virtual Local Area Network (VLAN) segregation. In some aspects, network 106 can be a corporate, campus, or other network that typically can have hundreds or even thousands of nodes on the network. In alternative aspects, network 106 can be a home or small business network. In further alternative aspects, network 106 can be a special purpose network such as a storage area network. In such a network, the nodes on the network may be storage nodes that manage the allocation of files on the network and compute nodes that provide compression, encryption, and/or management services for the network.

In the example illustrated in FIG. 1, a node 102 includes a network discovery service 104. A network discovery service 104 on node 102 can perform operations to discover configuration information about other nodes, routers and/or gateways on network 106.

Further details regarding node 102 and network discovery service 104 are provided below with reference to FIG. 2.

Figure 2:
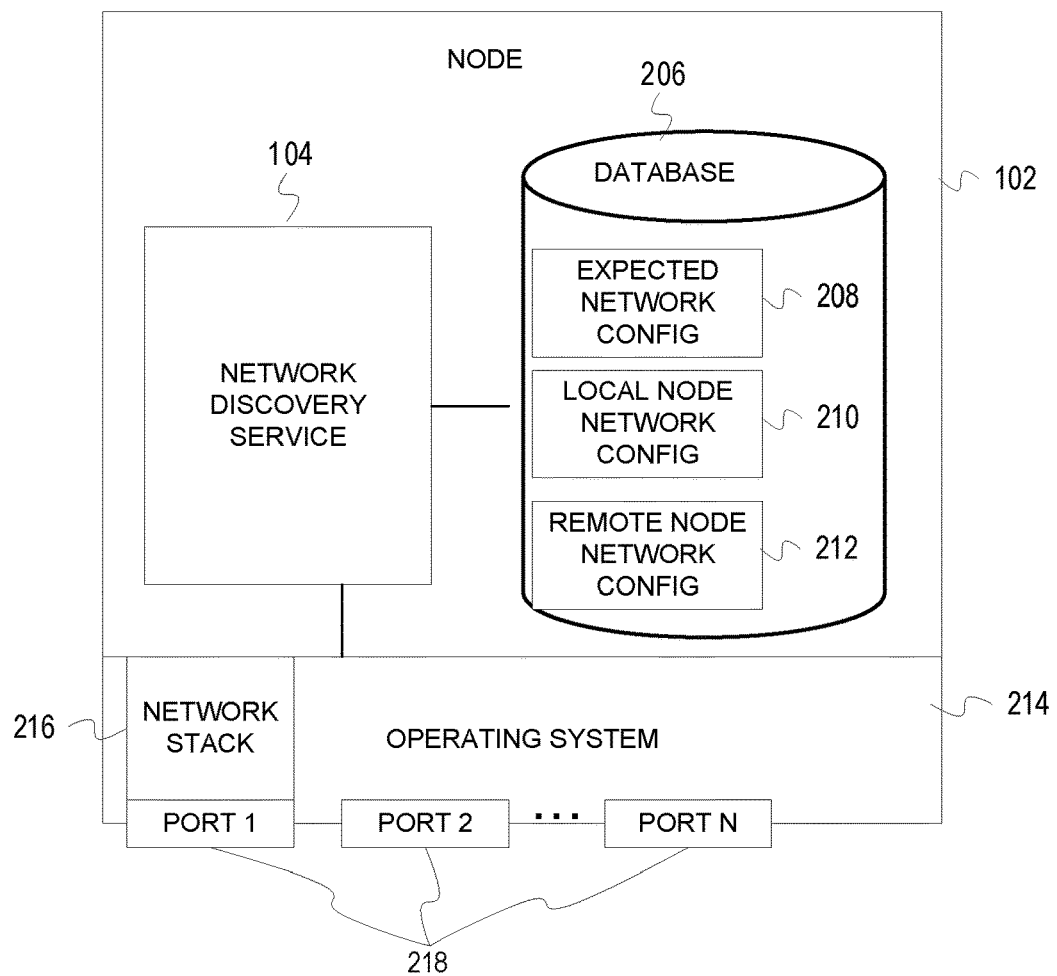
FIG. 2 depicts an example network node having a network discovery service.

FIG. 2 depicts an example network node 102 having a network discovery service 104. Node 102 can include one or more ports 218. A port 218 can include hardware, software and/or firmware to couple node 102 to a type of wired or wireless network supported by the port. As used herein, a port refers to a physical network interface to a physical port coupling the node to a wired or wireless network. For example, a port can comprise a network interface card or chip, a USB interface to a network adapter, or other such interface. In aspects where node 102 supports more than one port 218, the ports can couple node 102 to a same type of network, or can couple the node 102 to different types of networks from one another.

Node 102 can include an operating system 214. Operating system 214 can schedule the execution of applications and services running on node 102. Further, operating system 214 can manage the resources of node 102, and can provide interfaces between the applications and services running on node 102 and hardware components of node 102 (e.g., ports 218).

Operating system 214 can include a network stack 216. Network stack 216 can provide an interface between the applications and services running on node 102 and the network coupled to node 102 via a port 218. For example, network stack 216 can be a TCP/IP protocol stack providing application, transport, internet, and network interface layers.

Network discovery service 104 can utilize application program interfaces (APIs) provide by operating system 214 and network stack 216 in operations to discover the ports on node 102, and to discover network configuration details regarding networks coupled to node 102 via the one or more ports 218. In some aspects, network discovery service 104 can be implemented as a set of one or more processes executing under the control of operating system 214. In alternative aspects, network discovery service can be implemented using a combination of one or more processes and threads. In further alternative aspects, network discovery service 104 can be implemented as a set of functions, subroutines or methods as part of a different service or application. In still further aspects, network discovery service 104 can be implemented as a set of functions, subroutines or methods integrated with operating system 214.

Network discovery service 104 can maintain data regarding the network configuration details in a database 206. Database 206 can be a relational database, a hierarchical database, a file system-based database, an in-memory database, an XML based database or any other structure for storing a collection of information. In some aspects, database 206 can include a local node network configuration 210, a remote node network configuration 212, and an expected network configuration 208. Local node network configuration 210 can include data regarding the network configuration for node 102. Remote node network configuration 212 can include data regarding network configurations of one or more remote nodes on network 106. The remote node network configuration 212 can be discovered by a network discovery service 104 using operations detailed below with reference to FIGS. 3 and 4. Expected network configuration 208 can include data regarding how a node is expected to be configured. For example, the expected network configuration 208 can include data for different network configurations that can be based on the type of network and/or desired characteristics of the network (bandwidth, latency etc.). The expected network configuration can include configuration parameters that are in accord with known best practices at the time the expected network configuration data is set. In some aspects, the data maintained in expected network configuration 208, local node network configuration 210 and remote node network configuration 212 can include various combinations of one or more of the following data:

- Service addresses (DHCP, DNS, Network Time Protocol (NTP) etc.)
- Gateway IP address(es)
- Starting IP address
- Used/Available IP addresses
- MTU—Maximum Transmission Unit
- Routing data
- Port type
- Default VLAN and VLANs discovered as described below
- Broadcast domain info
- Broadcast domain segmentation
- Bond modes In some aspects, the data can be maintained on a per port basis. In alternative aspects where a port can support more than one type of network (e.g., multiple Ethernet technologies on a single port), the data can be maintained on a per port and per type basis.

Multiple nodes on network 106 can include a network discovery service 104. The network discovery service 104 can thus be configured as part of a distributed network discovery service where the network discovery services running on the multiple nodes share data with one another. In some aspects, one of the nodes may be designated or elected as a master node with one or more peer nodes. The network discovery service 104 on the master node can collect, aggregate and/or correlate information maintained by the network discovery services 104 running on other nodes. The distributed network discovery service 104 need not rely on any particular peer network discovery service to function. Further, the node that is operating as a master node can change in the event a current master node becomes unavailable. The distributed network discovery service can also be configured as a peer-to-peer network discovery service in which the network discovery services 104 on the multiple nodes share information with each other. In alternative aspects, each node running a network discovery service 104 can individually collect and maintain the data.

Further details regarding operations that can be performed by network discovery service 104 are provided below with reference to FIGS. 3 and 4.

Figure 3:
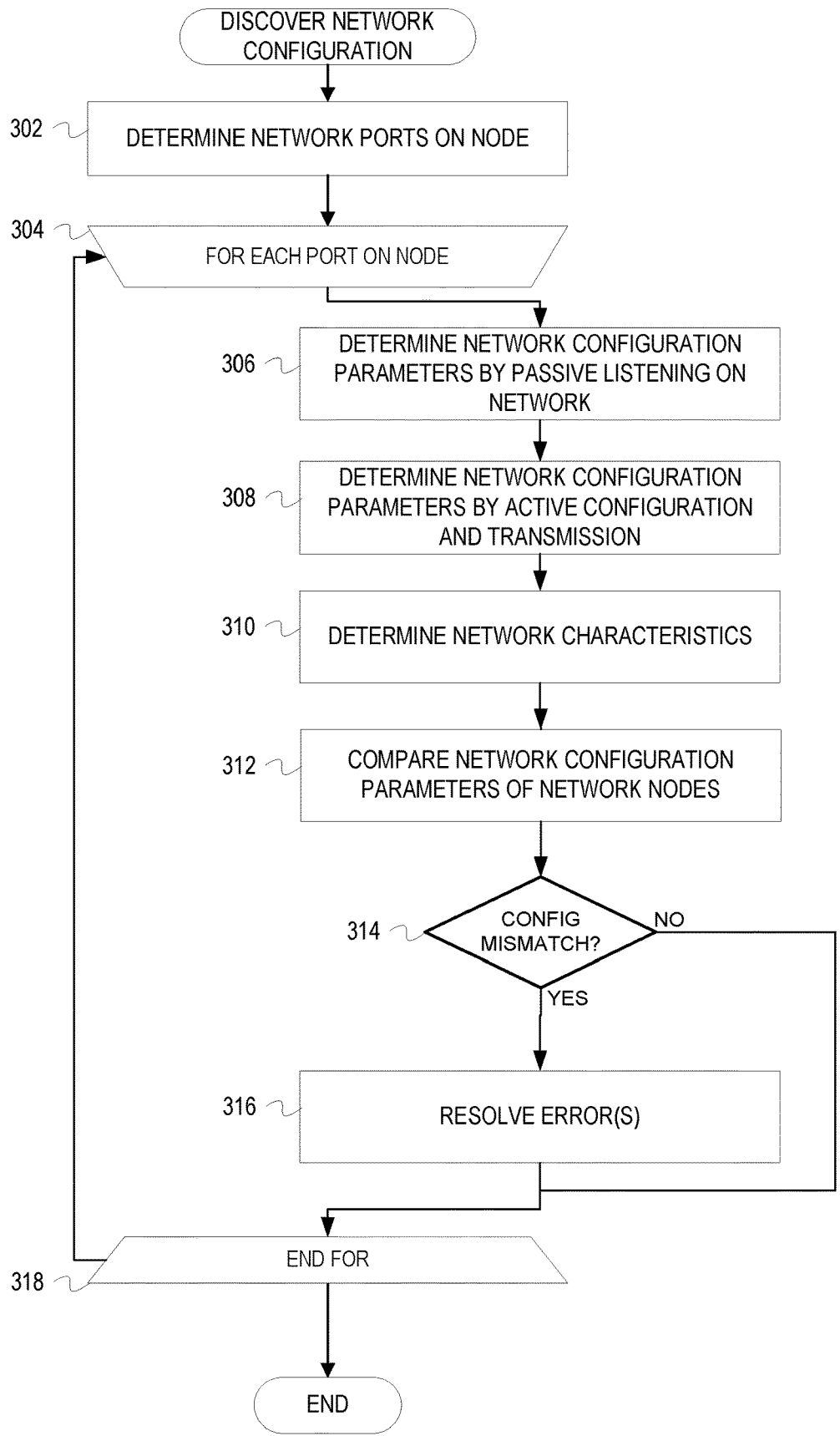
FIG. 3 depicts a flowchart of example operations for discovering a network configuration and network configuration parameters.

FIG. 3 depicts a flowchart of example operations for discovering a network configuration and network configuration parameters. The operations illustrated in FIG. 3 can be performed by a node 102, for example, by a network discovery service 104 of the node. In some aspects, the operations illustrated in FIG. 3 can be performed continuously. This can allow the node to discover data about the configuration of new nodes that join the network. In alternative aspects, the network discovery service can be performed at periodic intervals or upon a triggering event (e.g., node restart, receipt of a packet from a previously unknown node etc.). Each node that executes the network discovery service 104 can continuously perform discovery as an independent entity. Upon joining a distributed discovery service, information can be shared with a new node to speed up the new node's ability to check, test, and/or confirm the network configuration. For example, a new node may receive data about the network configuration from a node that has already discovered at least a portion of the network topology and network configuration parameters. The new node can use the data to confirm its own configuration, and to eliminate the need to discover information that has already been discovered by the node that has previously performed network discovery.

At block 302, a network discovery service can determine one or more network interfaces for physical ports on the node. In some aspects, the network discovery service can issue a query via one or more operating system calls. The operating system can return information regarding the one or more ports, including a number of available ports, port types, port identifiers etc.

Block 304 is the top of a loop that includes operations that are performed for each of the ports determined at block 302.

At block 306, the network discovery service can determine network configuration parameters by passively listening (i.e., receiving) packets that are being transmitted over a network coupled to the node via the current port under consideration. The operation is passive in the sense that the node need not transmit any packets on the network in order to perform the discovery operation. The packets need not be directly addressed to the node. Instead, the network discovery service can attempt to receive all packets being transmitted over the network, regardless of the ultimate destination address of the packet.

The network discovery service can inspect various portions of the network packet in order to determine configuration parameters of the network. For example, the network discovery service can inspect TCP/IP port information in a TCP/IP header of the packet to determine if the packet has a source port identifier that is associated with a known service. The network discovery service can then determine whether or not a service associated with the port exists on the network. As an example, the network discovery service can determine whether a DHCP, DNS, NTP or other known service type exists on the network based on whether or not packets having the associated TCP/IP port identifiers are being transmitted on the network. If such packets are discovered, the network discovery service can also obtain the TCP/IP address of the associated service from the packet header.

Further, the network discovery service can inspect the network packet to determine if it is a broadcast packet. If the packet is a broadcast packet, the network discovery service can use the information in the packet to aid in determining the broadcast domain and broadcast domain segmentation of the network.

Also, the network discovery service can listen for Address Resolution Protocol (ARP) packets. The network discovery service can discover gateway information (e.g., a gateway IP address, gateway MAC address etc.) from packets that are transmitted on the network when another node on the network asks for the gateway address. For example, an ARP "who has" packet can include information about a gateway IP address. Further, the "who has" packet can include a VLAN tag that identifies an active VLAN on the network. The gateway addresses and VLAN tags of VLANs on the one or more networks coupled to a node can thus be discovered by passively listening on the networks.

Additionally, the network discovery service can also listen for various beacons that may be transmitted by services on the network. For example, the network discovery service can determine whether the network is configured for LLDP (Link Layer Discovery Protocol) or CDP (Cisco Discovery Protocol) based on whether or not beacons associated with LLDP and/or CDP are transmitted on the network.

Further, the network discovery service can use Media Access Control (MAC) addresses from packet headers to determine the type or types of nodes on the network. Because groups of MAC addresses are typically assigned to individual manufacturers of network capable devices, the MAC address may be used to infer whether the node is a switch, router, gateway, desktop, laptop, smart phone etc. based on the manufacturer. Further, certain MAC addresses may be associated with certain types of virtual machines. The network discovery service can infer that certain nodes may be running virtual machines based on the presence of such MAC addresses.

At block 308, the network discovery service can actively determine network configuration parameters. In other words, the network discovery service can transmit packets over the network, and can use responses to the transmitted packets to determine network configuration parameters. As an example, the network discovery service can perform TCP/IP port scans of the nodes on the network to determine which TCP/IP ports and addresses are in use on the network. In some aspects, the network discovery service can perform active discovery by applying the discovery techniques described herein to peer nodes that are also running the network discovery service. In alternative aspects, the network discovery service can perform active discovery by attempting to transmit and receive to/from all active nodes in the network. In alternative aspects, the network discovery service can attempt to discover all active nodes in the network, and attempt to perform further detailed discovery of the configuration parameters for a smaller subset of the discovered nodes (e.g., sample nodes). The sample size can be selected so as to be sufficient to cover the network segments and components present on the network. For example, the sample size can be selected such that at least one node on each network segment is included in the sample. Further, the sample size can be determined based, at least in part, on the total number of nodes discovered in the network, or the total number of nodes on each segment of the network. Other means of determining sample nodes can be used and are within the scope of the inventive subject matter. Further details on actively determining network configuration parameters are provided below with reference to FIG. 4.

At block 310, the network discovery service can optionally determine network characteristics based on the information discovered at blocks 306 and 308. For example, the network discovery service can infer, based on the presence of desktop or laptop devices on a network that the network is a general purpose client/server network. Alternatively, the network discovery service can infer from the presence of a large amount of file transfer traffic, e.g., Internet Small Computer Systems Interface (iSCSI) packets, that the network is a server or storage area network. Other types of network traffic can be used to infer the types of devices and type of network on the port currently under consideration.

At block 312, the network discovery service can compare the information obtained at blocks 306 and 308 from the nodes on the network connected to the port currently under consideration. For example, the network discovery service can compare MTUs, IP address settings, bond modes or other network configuration data from the nodes of the network coupled to the port under consideration. In some aspects, the configuration data can be normalized based on node types or other known configuration information. For example, a normalized data value could be a lowest common denominator, a most common value, or a known good value.

At block 314, the network discovery service can use the results of the comparison to determine if there is a mismatch between the one or more nodes on the network indicating that a node or nodes are misconfigured. For example, a mismatch in the MTU can indicate that a node does not have the proper MTU configured. This can result in degradation in network and system performance.

If the check at block 314 determines that there is a mismatch in network configuration data for at least one node, then at block 316, the network discovery service can perform operations to resolve the potential error. In some aspects, the network discovery service can issue a command to the affected node to cause the node to update the mismatched network configuration parameter. The updated parameter can be based on known best practices as represented in the expected network configuration data 208 (FIG. 2). Further, the updated parameter can be based on a known good configuration from a master node. Still further, the updated parameter can be based on a most common value found during the discovery process. In alternative aspects, the network discovery service can issue a report or alert indicating the node experiencing the mismatch, and a recommended action and/or value to be used to cure the potential erroneous mismatch.

Block 318 is reached if the check at block 314 does not determine any mismatches in the network configuration of the nodes on the network, or if a mismatch has been detected and a resolution action has been initiated. Block 318 is the bottom of the for loop starting at block 304. If there are ports on a node that remain to be analyzed by the network discovery service, flow returns to block 304 to begin processing the next port on the node. If no ports remain to be processed, then the method ends.

Figure 4:
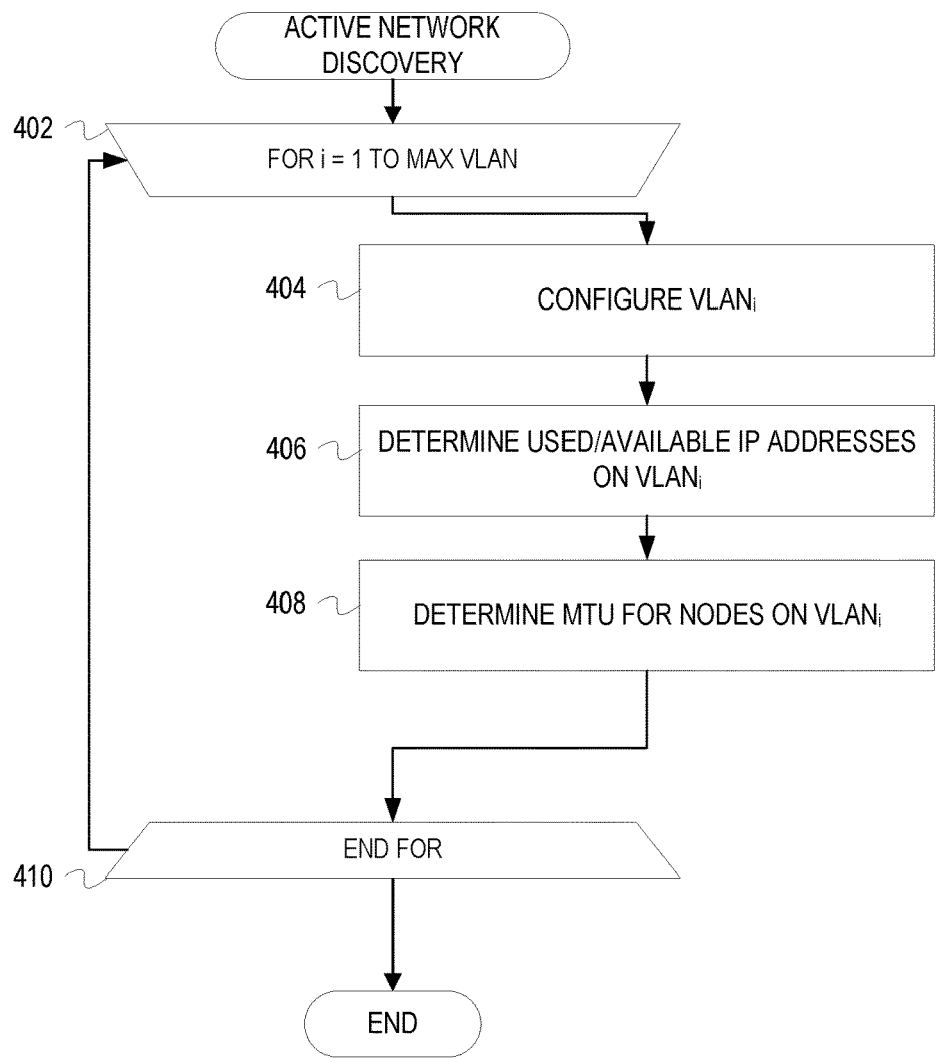
FIG. 4 depicts a flowchart of example operations for performing active network discovery.

FIG. 4 depicts a flowchart of example operations for performing active network discovery. The flowchart provides further details of operations that may be performed as part of block 308 of FIG. 3 described above.

Block 402 is the top of a loop that processes a series of VLANs. The loop can iterate over valid VLAN tags. Although shown as iterating starting at a lowest valid VLAN tag to a highest VLAN tag, other orders can be used. For example, the method could start by testing known active VLANs that were discovered during the passive listening described above with respect to FIG. 3, followed by testing VLANs having identifiers (i.e., tags) that were not determined to be known active VLANs.

At block 404, the network discovery service configures a VLAN for the node executing the discovery service. For example, the network discovery service can configure a VLAN having the current $VLAN_i$ tag. Further, subnets can be configured for the current $VLAN_i$ under consideration. Various subnet configurations on the VLAN can be used to determine network configuration parameters as described below. In some aspects, the network discovery service can attempt to automatically determine a gateway IP address for the VLAN. Gateway IP addresses are typically the first or last IP address in a range of IP addresses. The network discovery service can transmit a packet to the first and/or last IP address of the IP range and use the response, if any, to determine if a gateway is present at the IP address.

In some aspects, the network discovery service can determine a subnet mask for the $VLAN_i$ under consideration. For example, the network discovery service can create a network subinterface on the port under consideration for each possible subnet mask 255.0.0.0-255.255.255.252, where the network subinterfaces are associated with the current $VLAN_i$ under consideration. The network discovery service can then ping the gateway (discovered or guessed as described above) using each network subinterface. The network subinterface having the smallest subnet mask that receives a response from the gateway is used to determine the subnet mask for the network. Thus, knowing only a gateway address and VLAN, the subnet mask can be determined for the network.

At block 406, the network discovery service can determine the available and used IP addresses on the VLAN. For example, the network discovery service can transmit test packets to IP addresses on a range of IP addresses on the VLAN. The packet can be an ARP, Internet Control Message Protocol (ICMP) packet, or rping packet. A response to the packet can indicate that the IP address is in use. A lack of response can indicate that the IP address is not in use and therefore available. The network discovery service can save the used and available IP addresses as part of the remote node network configuration 212.

At block 408, the network discovery service can determine MTU values for nodes reachable via the current VLAN. In some aspects, the network discovery service can iteratively issue requests to a remote node to respond with a packet of having a size determined by the network discovery service. In some aspects, the ICMP echo command can be used to request a packet from the remote node. The size can initially be less than or equal to a lowest valid MTU value. After each iteration, the network discovery service can increase the requested size. The network discovery service can then check to see if the response packet was fragmented (i.e., divided into at least two portions for transmission) by the remote node. The requested packet size used in the iteration just prior to the point that the remote node begins to fragment response packets can be used as the MTU value for the remote node. This value can be stored in the remote node network configuration 212.

Alternatively, the network discovery service can start with a maximum value and decrease the MTU size until a packet is successfully received. For example, the network discovery service can set a "Do Not Frag" flag in the ICMP packet to request that the response not be fragmented. The network discovery service can then start at a maximum MTU size and iteratively decrease the MTU size until a response is received indicating the response could be transmitted without fragmentation.

Block 410 is the bottom of the loop starting at block 402. If valid VLAN tags remain to be processed, flow returns to block 402 to process the next VLAN tag. If no valid VLAN tags remain to be processed, then the method ends.

The methods described above with respect to FIGS. 3 and 4 can be performed by a guest operating system of a virtual machine. For example, in an HCI system, one or more guest operating systems can be created or designated for performing the operations. Virtual network interfaces backed by the physical network ports of the HCI system can be created within the guest OS. The virtual network interfaces can then be used in the methods described above to determine network configuration for the nodes on the network. The operations performed above can be distributed across the virtual network interfaces and performed in parallel.

As will be appreciated from the above, the network discovery service can be used to discover and learn various characteristics and configuration data for a network infrastructure. The discovered configuration data can be used to automatically resolve errors in network configuration that can degrade performance of a node or system on the network, or even prevent proper operation of the system.

Variations

As discussed above, the network discovery service can be used to discover and learn information about the network infrastructure components of a network communicably coupled to a node. In addition to detecting and resolving errors (either automatically or providing reports with recommended actions), the network discovery service can be used to automatically self-configure a node that is newly attached to a network. For example, a node that couples to a network for a first time can use data obtained from the network discovery service to determine an unused IP address. The node can then self-configure itself with the unused IP address, and can use other discovered network configuration data such as MTU, gateway address, service addresses etc. to automatically configure itself.

Further, the data gathered by the network discovery service can be used to configure other nodes on the network. For example, as discussed above, the network discovery service can use characteristics of the nodes on the network to configure various infrastructure elements. For example, if the network discovery service detects that various user devices (laptops, desktop computers, smart phones etc.) are present on the network, the network discovery service can whitelist or blacklist the devices as appropriate to ensure that the user devices can communicate with appropriate services and/or be prevented from communicating with services that are not appropriate to user level devices. Similarly, if the network discovery service determines that MAC addresses associated with virtual machines created by a particular third-party product, a software application can be configured to communicate properly with the third-party product.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 306 and 308 of FIG. 3 can be performed in parallel or concurrently. Further, the operations can be performed across multiple network ports and network interfaces in parallel. Similarly, the operations depicted in blocks 406 and 408 of FIG. 4 can be performed in parallel or concurrently. Again, the operations can be performed in parallel both with respect to one another and with respect to the network ports and network interfaces on the node. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
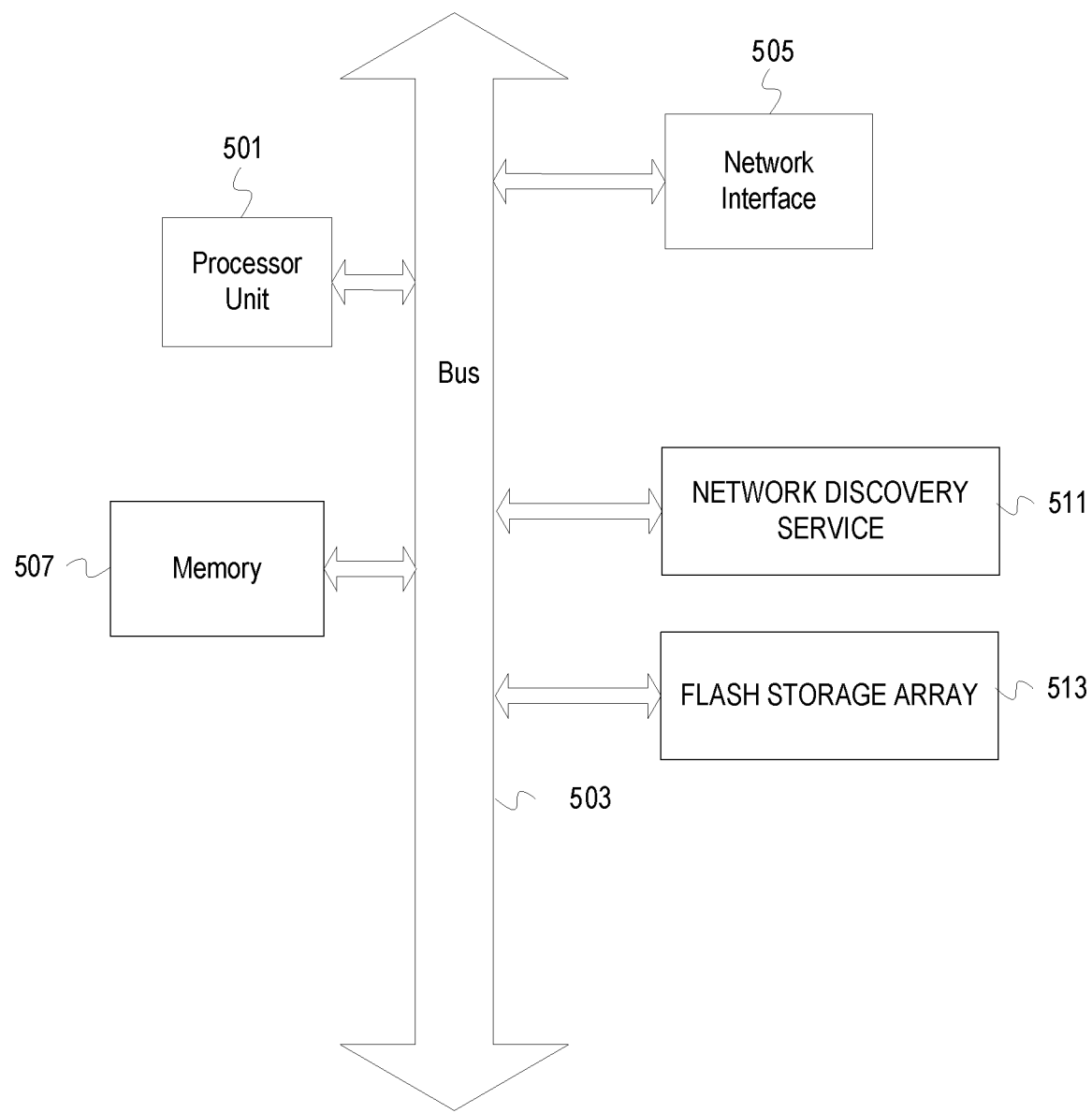
FIG. 5 depicts an example computer system with a network discovery service.

FIG. 5 depicts an example computer system with a network discovery service. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a network discovery component 511. The network discovery component 511 can be configured with a network discovery service to discover various configuration parameters regarding nodes on a network accessible via network interface 505. The system can also include a storage array 513. The storage array can be an all flash storage array, disk array, hybrid array, etc. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for discovering network configuration parameters as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The disclosure uses the term "node" to refer to any device that is capable of communicably coupling to a network. Those of skill in the art will appreciate that "station," "network attached device" are other terms that are equivalent to a node.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method for implementing network discovery within a network performed by one or more processors of a first node of a plurality of nodes of the network, the method comprising:
receiving, by a network discovery service running on the first node, packets from one or more remaining nodes of the plurality of nodes by passively listening on one or more ports of the first node;
determining, by the network discovery service, a plurality of network configuration parameters for each of the one or more remaining nodes by inspecting the packets;
identifying, by the network discovery service, a configuration of the plurality of network configuration parameters for each type of a plurality of types of nodes represented by the plurality of nodes by normalizing values of the plurality of network configuration parameters based on one of a lowest common denominator from the network configuration parameters, a most common value from the network configuration parameters, and a known good value; and
facilitating, by the network discovery service, checking, testing, or self-configuration of a network configuration of a node of the plurality of nodes based on the configuration for a type of the plurality of types of nodes associated with the node wherein the node comprises the first node or a new node of the network.

2. The method of claim 1, wherein the configuration comprises a known good configuration.

3. The method of claim 1, further comprising:
determining, by the network discovery service, existence of a particular service on the network by inspecting Transmission Control Protocol (TCP)/Internet Protocol (IP) port information contained within a TCP/IP header of one or more of the packets.

4. The method of claim 1, further comprising:
determining a broadcast domain segmentation of the network based on one or more broadcast packets of the packets.

5. The method of claim 1, wherein the network discovery service is configured as part of a distributed network discovery service in which one or more discovery nodes of the plurality of nodes run the network discovery service and wherein the method further comprises collecting, aggregating, or correlating, by the network discovery service running on the first node, information discovered by the one or more discovery nodes.

6. The method of claim 1, wherein the network discovery service is configured as part of a peer-to-peer distributed network discovery service in which one or more discovery nodes of the plurality of nodes run the network discovery service and wherein the first node and the discovery nodes share information with each other via their respective network discovery services.

7. The method of claim 1, wherein the plurality of network configuration parameters include one or more of:
a gateway Internet Protocol (IP) address; an IP address setting; a Maximum Transmission Unit (MTU); and a Virtual Local Area Network (VLAN).

8. The method of claim 1, wherein the plurality of network configuration parameters are determined based on one or more of:
a service addresses of a service on the network; a gateway IP address; a starting IP address; a list of used or available IP addresses within the network; routing data; a port type; a default VLAN; and broadcast domain information.

9. One or more non-transitory machine-readable media comprising program code for implementing network discovery within a network, which when executed by one or more processors of a first node of a plurality of nodes of the network cause the one or more processors to:

receive, by a network discovery service running on the first node, packets from one or more remaining nodes of the plurality of nodes, wherein the packets are not destined for the first node;

determine, by the network discovery service, a plurality of network configuration parameters for each of the one or more nodes by inspecting the packets;

for each type of a plurality of types of nodes, identify, by the network discovery service, a known good configuration of the plurality of network configuration parameters by normalizing values of the plurality of network configuration parameters based on one of a lowest common denominator from the network configuration parameters, a most common value from the network configuration parameters, and a known good value; and facilitate, by the network discovery service, checking, testing, or self-configuration of a network configuration of the first node or a new node of the network based on the known good configuration for a type of the plurality of types of nodes associated with the first node or the new node, respectively.

10. The one or more non-transitory machine-readable media of claim 9, wherein the plurality of network configuration parameters include one or more of:
a gateway Internet Protocol (IP) address; an IP address setting; a Maximum Transmission Unit (MTU); and a Virtual Local Area Network (VLAN).

11. The one or more non-transitory machine-readable media of claim 9, wherein the plurality of network configuration parameters are determined based on one or more of:
a service addresses of a service on the network; a gateway IP address;
a starting IP address; a list of used or available IP addresses within the network;
routing data; a port type; a default VLAN; and broadcast domain information.

12. The one or more non-transitory machine-readable media of claim 9, wherein the network discovery service is configured as part of a distributed network discovery service in which one or more discovery nodes of the plurality of nodes run the network discovery service and wherein the program code further causes the one or more processors to collect, aggregate, or correlate, by the network discovery service running on the first node, information discovered by the one or more discovery nodes.

13. The one or more non-transitory machine-readable media of claim 9, wherein the network discovery service is configured as part of a peer-to-peer distributed network discovery service in which one or more discovery nodes of the plurality of nodes run the network discovery service and wherein the first node and the discovery nodes share information with each other via their respective network discovery services.

14. A system comprising:
one or more processors;
one or more ports communicably coupled to the one or more processors; and
a non-transitory computer-readable medium, coupled to the one or more processors, having stored therein instructions that when executed by the one or more processors cause the one or more processors to:
receive, by a network discovery service running on the system, a plurality of packets from one or more nodes of a plurality of nodes on a network to which the system is attached by listening on the one or more ports for packets not destined for the system;
determine, by the network discovery service, a plurality of network configuration parameters for each of the one or more nodes by inspecting the plurality of packets;
identify, by the network discovery service, a known good configuration of the plurality of network configuration parameters for each type of a plurality of types of nodes by normalizing values of the plurality of network configuration parameters based on one of a lowest common denominator from the network configuration parameters, a most common value from the network configuration parameters, and a known good value; and
facilitate, by the network discovery service, checking, testing, or self-configuration of a network configuration of the system or a new node of the network based on the known good configuration for a type of the plurality of types of nodes associated with the first node or the new node, respectively.

15. The system of claim 14, wherein the instructions further cause the one or more processors to determine, by the network discovery service, existence of a particular service on the network by inspecting Transmission Control Protocol (TCP)/Internet Protocol (IP) port information contained within a TCP/IP header of one or more of the packets.

16. The system of claim 14, wherein the instructions further cause the one or more processors to determine a broadcast domain segmentation of the network based on one or more broadcast packets of the packets.

17. The system of claim 14, wherein the network discovery service is configured as part of a distributed network discovery service in which one or more discovery nodes of the plurality of nodes run the network discovery service and wherein the instructions further cause the one or more processors to collect, aggregate, or correlate, by the network discovery service running on the system, information discovered by the one or more discovery nodes.

18. The system of claim 14, wherein the network discovery service is configured as part of a peer-to-peer distributed network discovery service in which one or more discovery nodes of the plurality of nodes run the network discovery service and wherein the system and the discovery nodes share information with each other via their respective network discovery services.

19. The system of claim 14, wherein the plurality of network configuration parameters are determined based on one or more of:
a service addresses of a service on the network; a gateway IP address; a starting IP address; a list of used or available IP addresses within the network; routing data; a port type; a default VLAN; and broadcast domain information.

* * * * *